July 11, 1944.  A. B. HASLACHER  2,353,402
METHOD OF MAKING IMPERVIOUS BAGS
Filed April 8, 1942  3 Sheets-Sheet 1

Inventor
Alfred B. Haslacher,
By [signature]
Attorney

July 11, 1944. A. B. HASLACHER 2,353,402
METHOD OF MAKING IMPERVIOUS BAGS
Filed April 8, 1942 3 Sheets-Sheet 2
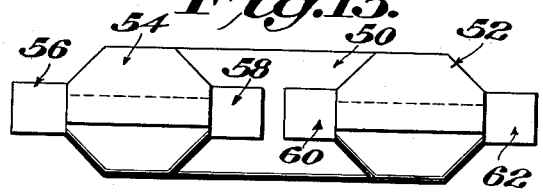
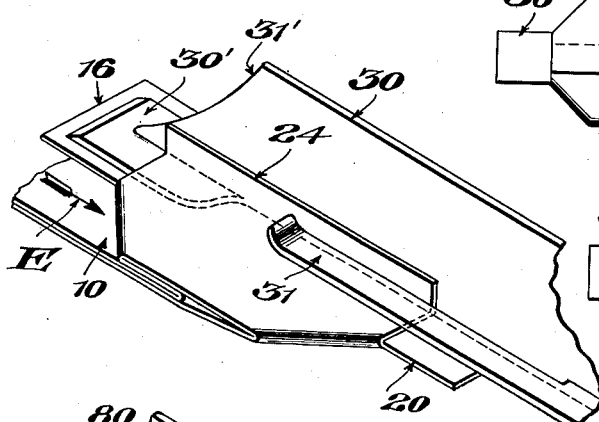
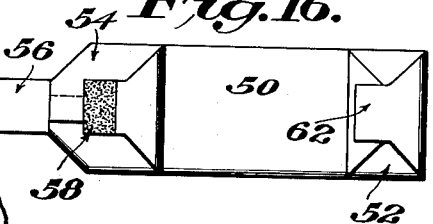
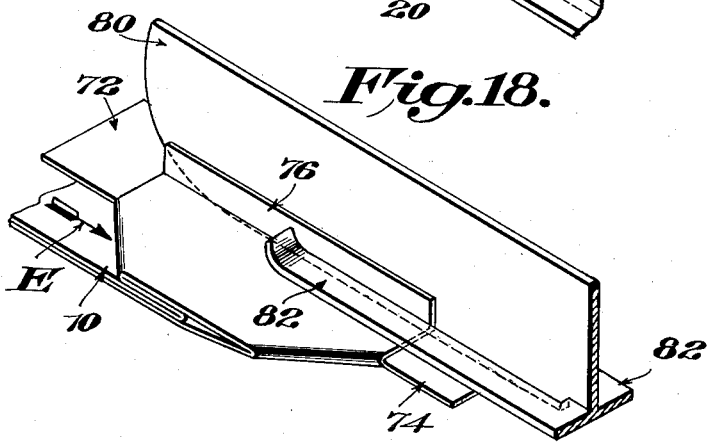
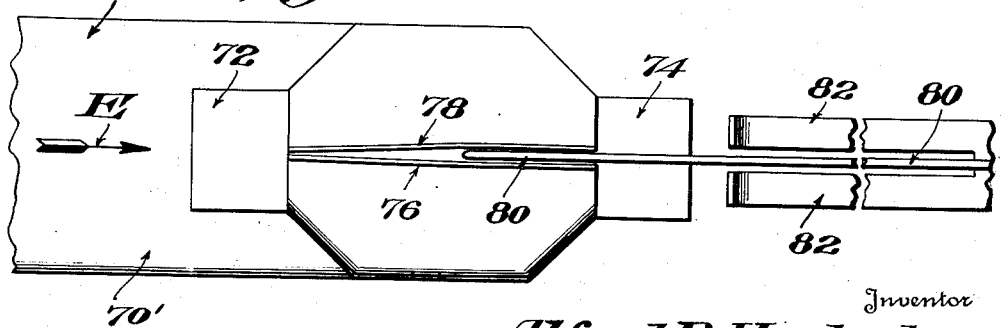
Inventor
Alfred B. Haslacher,
By Ross C. Hurrey
Attorney July 11, 1944.  A. B. HASLACHER  2,353,402
METHOD OF MAKING IMPERVIOUS BAGS
Filed April 8, 1942  3 Sheets-Sheet 3
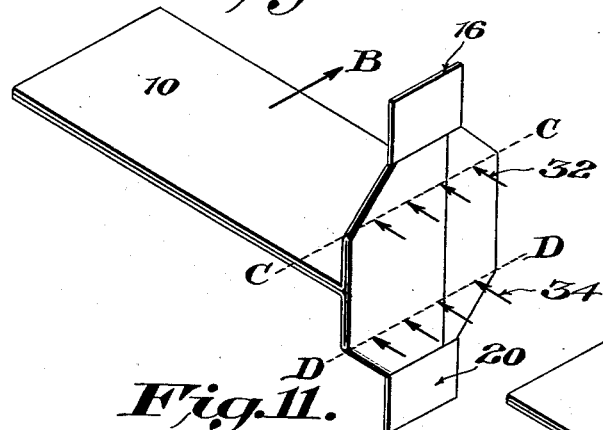
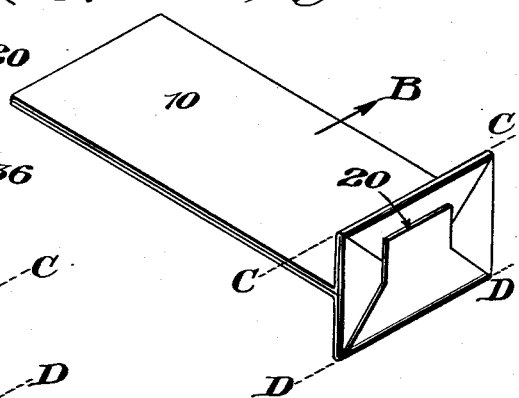
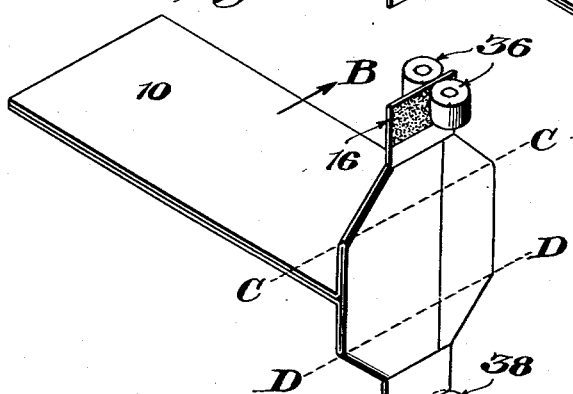
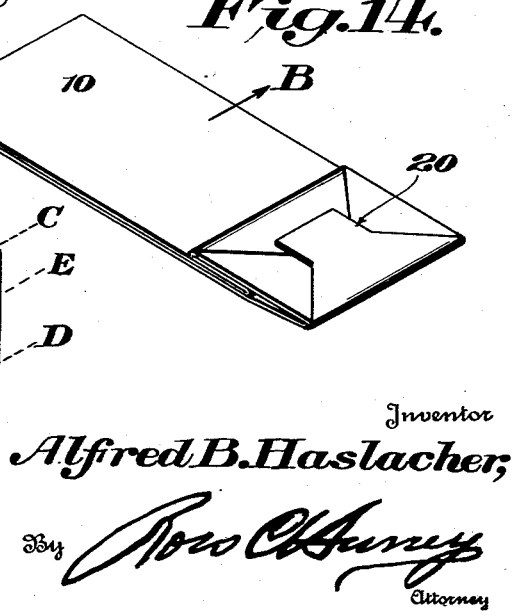
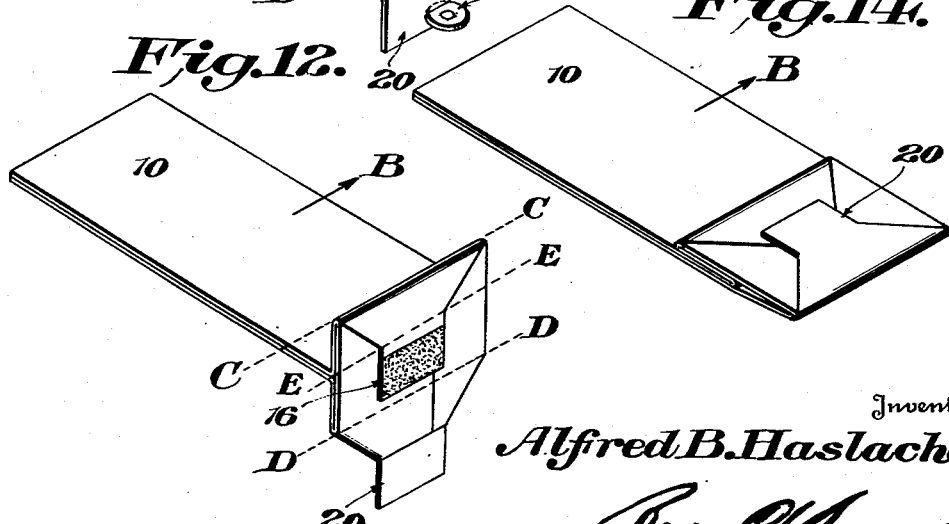
Inventor
Alfred B. Haslacher,
By
Attorney Patented July 11, 1944

2,353,402

UNITED STATES PATENT OFFICE 2,353,402

METHOD OF MAKING IMPERVIOUS BAGS

Alfred B. Haslacher, New York, N. Y.

Application April 8, 1942, Serial No. 438,161

25 Claims. (Cl. 93—35)

It is an object of this invention to provide a method of making the bags described in my application, Ser. No. 395,303, filed May 26, 1941, and in my application, Ser. No. 429,311, filed February 2, 1942.

It is a further object of this invention to provide a method of making bags as aforesaid which lends itself to application by mechanical means.

It is a further object of this invention to provide a method of making bags as aforesaid which may be carried out with a minimum departure from existing bag making equipment.

It is a further object of this invention to provide a method of making bags as aforesaid in which the method of heat sealing disclosed in my application, Ser. No. 417,566, filed November 1, 1941, is particularly applicable.

These and other objects will be made clear from the following detailed description, taken in connection with the annexed drawings in which:

Fig. 5A is a detail of the operation illustrated in Fig. 5;

Fig. 10 shows the bag blank of Fig. 8 with the diamond fold at right angles to the body of the bag and illustrates the formation of transverse heat seals;

Fig. 11 is a view similar to Fig. 10 illustrating the application of adhesive to one flap of the diamond fold and the trimming of the other flap;

Fig. 12 is a view similar to Figs. 10 and 11 illustrating the formation of the first transverse fold of the diamond;

Fig. 13 is a view similar to Fig. 12 illustrating the completion of the bottom folds;

Fig. 14 is a view similar to Fig. 13 but showing the completed bottom folded into the plane of bag body;

Fig. 15 is a view similar to Fig. 3 showing a modified form of construction in which a diamond fold is opened at each end of the tube length;

Fig. 16 is a view similar to Fig. 15 illustrating the complete closure of the diamond fold at one end of the tube and the partial closure of the diamond fold at the other end;

Fig. 17 illustrates a method alternative to that illustrated in Fig. 5; and

Fig. 18 illustrates the step subsequent to that shown in Fig. 17.

The problem solved by this invention is inherent in any effort to form an impervious bottom for a bag of the automatic or satchel bottom type. An impervious bottom of this type is relatively easy to form if the tube to be bottomed is fully expanded, and if support is afforded across the cross section of the bag for the application of sealing pressures. The problem is totally different if the bottom is to be formed on a flattened tube without opening or distension thereof. There are many machines for sealing filled packages which, with slight modification, would produce such closures on empty bags. Such minimal modification, however, would not eliminate the major defects of such machines, which lie in their low maximum speed. Packaging machines of this type rarely exceed a speed of forty closures per minute, and never attain fifty per minute. The bag manufacturer, however, must attain a minimum of one hundred bags per minute, and should attain from one hundred and fifty to two hundred. Indeed, speeds far in excess of two hundred per minute are not uncommon in bag making machines.

A study of the bag bottom structure will show that when operating on a flattened tube, problems arise which are not encountered in sealing an open, filled tube. With the flattened tube there is extreme danger of "blocking," that is, of sealing together portions of the interior of the bag so located that the seals would make opening of the bag impossible. Accordingly, the bottom folds must be so manipulated that access may be had to both sides of any desired sealing area whereby the same may be exposed to a source of heat and, if desired, pressure to effect a seal with no danger of blocking. As will also be made clear hereinafter, the proportions of a diamond fold which will permit face to face contact of the inner surfaces of the edges of material intermediate the flaps forming the extremities of the diamond are such that the flaps may be unduly long. Accordingly, I have devised a method of trimming away an undesirable portion of either or both flaps. It is further a fact that the flaps are folded into superimposed relationship on the bottom of the bag, and are secured there by any suitable means, such as ordinary adhesive. Such sealing of these flaps does not contribute to the imperviousness of the bottom, but does contribute materially to the strength of the bottom and indirectly to its imperviousness by relieving the imperviously sealed areas of mechanical strains and stresses tending to separate these areas in directions normal to the planes of the seals, which directions are those in which such seals are most vulnerable.

Figure 1:
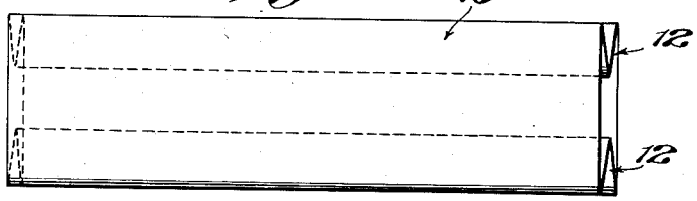
Fig. 1 is a plan view of a flattened tubular bag blank.

Fig. 1 shows a flattened length of tube 10 having gussets 12 formed therein. To prepare the tube 10 for the formation of an automatic bottom slits 14 are formed in one wall to define a flap 16, and parallel transverse score lines 18 and 18' are formed at predetermined distances from the slit end of the tube. In the opposite wall a flap 20 similar to the flap 16, but preferably of greater width, is similarly defined by a pair of slits.

A diamond fold is opened by maintaining the underflap 20 in its original plane and by folding the flap 16 rearwardly about the rearmost score line 18 and into the plane of the bag body. The edges 22 and 24 of the material intermediate the flaps 16 and 20 are brought into overlapping relationship by this opening of the diamond fold. The relationship is particularly illustrated in Fig. 4 which shows the body 10 as composed of an outer, non-thermoplastic ply 26 and an inner, thermoplastic ply 28. Although illustrated as two distinct plies, it is to be understood that the bag may be formed of a single ply of thermoplastic material or of a single ply of non-thermoplastic material coated on either or both sides with thermoplastic material, or it may be formed of a lamination of a thermoplastic and a non-thermoplastic sheet, with the thermoplastic sheet forming the interior of the bag.

Figure 3:
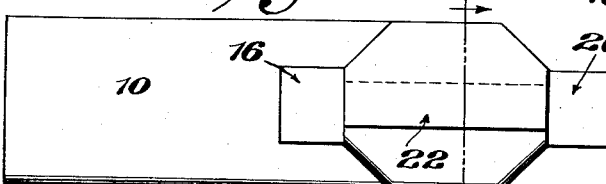
Fig. 3 is a view similar to Fig. 2, but showing the diamond fold fully opened.

In the ordinary manufacture of bags the slitting of the front and rear walls to define the flaps 16 and 20 would be carried out as part of the operation of forming the tube 10 and the opening of the diamond fold to the condition illustrated in Fig. 3 would take place immediately after the cutting off of a bag length from the continuously formed tube. The formation of the score lines 18 and 18' would ordinarily take place either during or immediately after severance of the bag length and before the opening of the diamond. The overlapping of the flaps 22 and 24 is not the usual practice and the extent of the overlap is regulated by the spacing of the score line 18 from the end of the bag length. The spacing of the score line 18 from the score line 18' is necessarily equal to the depth of the gusset. All of the principles of this method, although illustrated with respect to a gusseted bag are equally applicable to a "flat" tube, in which case the ultimate bottom will be of the "satchel bottom" rather than the "automatic bottom" type.

Figure 4:
Fig. 4 is a section on the line 4—4 of Fig. 3.
Figure 5:
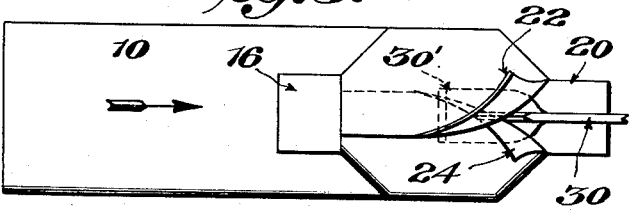
Fig. 5 is a view similar to Fig. 3, but illustrating the rearrangement of the central overlap of the diamond fold.
Figure 7:
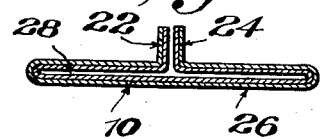
Fig. 7 is a section on the line 7—7 of Fig. 6.

Beginning with the condition illustrated in Fig. 5 the major elements of my process appear and it is immaterial whether the steps illustrated in Fig. 5 (and thereafter) be incorporated in the continuous manufacture of bags including the tubing operation, or whether the steps be applied to a series of blanks which have not only been severed from a continuous tube but have been slit and scored and have had the diamond folds opened to the condition illustrated in Figs. 3 and 4.

Figure 6:
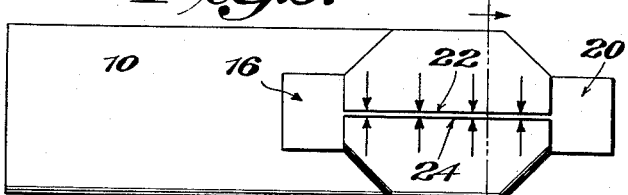
Fig. 6 illustrates the completion of the operation, the beginning of which was illustrated in Fig. 5.
Figure 9:
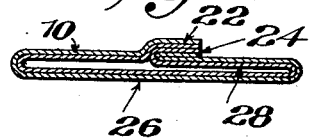
Fig. 9 is a section taken on the line 9—9 of Fig. 8.
Figure 8:
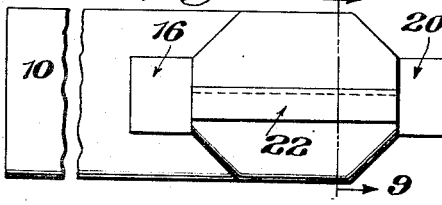
Fig. 8 is a plan view illustrating the condition of the bag bottom immediately following the steps illustrated in Figs. 6 and 7.

In Fig. 5 the bag blank in the condition of Figs. 3 and 4 advances in the direction of the arrow A. The overlapping flaps 22 and 24 encounter a fixed plough-share 30 which separates the flaps 22 and 24 and brings their edges into a plane normal to the plane of the remainder of the diamond fold. This operation is more particularly illustrated in Fig. 5A. The plough-share 30 comprises a flat, entering end 30' merging into a vertical plate 31'. The end 30' goes below the overlapped flaps 22 and 24. The slanting, forward end of the plate 31' ploughs up the flaps 22 and 24. As the flaps advance along the plate 31' they encounter guides 31 which bring the flaps into the relationship illustrated in Fig. 6. It is clear that so long as the plane of the diamond fold parallels the plane of the end 30' it is immaterial how the body 10 of the bag is disposed. While in this condition heat and/or pressure is applied to the upstanding edges to seal their inner surfaces together to form a fin. The precise mode of applying heat and/or pressure is immaterial. I prefer to utilize the airblast method disclosed in my application aforesaid, Ser. No. 417,566, filed Nov. 1, 1941. It is, however, entirely within the purview of my invention to utilize heated bars or heated wheels or heated belts, with or without pressure between the heated mechanical elements. As the bag advances the fin may be turned down into the plane of the diamond and thereupon assumes the position illustrated in Figs. 8 and 9.

While the fin must be turned down in order ultimately to complete the bag bottom, the precise time and circumstances of such turning down of the fin are largely immaterial. If after sealing of the fin while normal to the plane of the diamond it is desirable, for reasons of machine design, to continue axial advance of the fin, it may well be convenient through the use of stationary folders to turn down the fin during such continued movement. It is not, however, essential and it would be entirely convenient to turn down the fin at any phase of the transverse movement of the diamond fold hereinafter described. Such matters affect the design of machinery for carrying out the process but do not affect the process itself.

Up to the point just described it is clear that the relative movement between the bag blanks and the instrumentalities operating thereon must be in a direction parallel to the length of the bag. With the exception of the initial tilting step all of the steps described hereafter take place during relative movement of the bag and the operating instrumentalities in a direction at right angles to the length of the bag. The tilting step may, optionally, take place either during lengthwise movement of the bag or during movement at right angles thereto. It is further to be noted that, theoretically at least, the tilting step may take place immediately after opening of the diamond fold with the parts in the condition illustrated in Fig. 3. If this be done the steps of Figs. 5 through 9 inclusive may be carried out during relative movement between the bag and the operating instrumentalities in a direction not only at right angles to the length of the tube 10 but also at right angles to the plane of the tube.

In Figs. 10 to 14 inclusive I show the steps in the formation of a complete bag bottom. In these figures the diamond fold, though tilted into a plane at right angles to the plane of the tube 10, is nevertheless in the condition illustrated in Figs. 8 and 9. The tube 10, with the diamond fold thus tilted, moves, relatively to the operating instrumentalities, in the direction of the arrows B, that is: at right angles to the length of the tube 10 but in the plane of the tube.

In Fig. 10 I illustrate the formation of transverse heat seals 32 and 34 extending respectively along the lines C—C and D—D. The heat sealed areas should, preferably, be as narrow as possible but must not extend toward the interior of the diamond beyond the lines C—C and D—D. Such extension would seal the walls of the tube to the ultimate bottom and would prevent proper opening of the bag.

Figure 2:
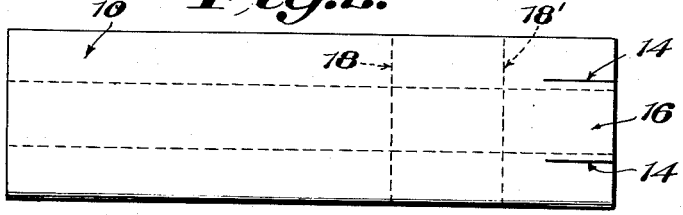
Fig. 2 is a view similar to Fig. 1 but showing the formation of slits to define the flaps of the diamond fold, and the location of the transverse score lines facilitating the opening of the diamond fold.

Fig. 11 shows the simultaneous performance of two steps. These are: application of paste to the flap 16; and trimming of excess material from the flap 20. The trimming is not always necessary. The necessity arises when the height of the upstanding fin (illustrated in Fig. 7) is so great as to require that the score line 18 (illustrated in Fig. 2) be so far removed from the end of the tube that flap 20, when folded along the line D—D (Figs. 10 to 13), would extend beyond the line C—C or, in practice, beyond the line E—E of Fig. 12. The line E—E represents the intersection of the slits defining flap 16 with the diagonal fold lines connecting the inner extremities of the slits with the edges of the front face of the tube 10. It is obvious that, in practice, the diamond fold, when tilted to the position shown in Figs. 10 to 13, must travel between relatively close fitting guides. Whenever paste is applied to a portion of the bag traveling between such guides, the paste must be so located that any portions of paste rubbing off on the guides will not be deposited on any portions of subsequent bags in such positions that the presence of paste would be undesirable. This condition may be met by applying paste to both sides of the flap 16 and confining such application to the portion of the flap lying between the inner and outer extremities of its defining slits 14. This pasting is accomplished by means of applicator roles 36 and the trimming of the flap 20 is preferably accomplished by means of a thin, high speed, rotary cutter 38.

Figs. 12, 13 and 14 illustrate the final stages in the formation of the bag bottom. In Fig. 12 the flap 16 has been folded along the line C—C against the bottom of the bag. In Fig. 13 the flap 20 has been folded along the line D—D and superimposed upon the flap 16. Due to the fact that both sides of the flap 16 are coated with adhesive (Fig. 11) the underside of the flap 16 is secured to the bag bottom and the inner surface of the flap 20 is secured to the outer surface of the flap 16. The particular pasting operation, while desirable from the standpoint of simplifying machine design, is not to be construed as a limitation upon the process and any desired pattern of paste may be applied to any portion of either or both of the flaps, provided the paste pattern is so limited and located as not to cause sticking between stacked bags after completion of the bag bottom. The impervious character of the bottom is not dependent on the securing of the flaps 16 and 20. The impervious closure is formed by the heat seal between the edges 22 and 24 illustrated in Figs. 6 and 7, and by the transverse heat seals along the lines C—C and D—D illustrated in Fig. 10. The securing of the flaps 16 and 20, however, serves to relieve the heat sealed portions from the effect of mechanical loads incident to filling and handling of the bags, which loads would otherwise exert separating forces in directions normal to the planes of the several heat seals. In practice the folding of the flaps 16 and 20 would be carried out by moving the bags, in the direction indicated, relative to fixed folders of the plough-share type. This use of plough-share folders will also serve to return the completed bottom from a plane normal or substantially normal to the plane of the tube and into the condition illustrated in Fig. 14.

Figs. 15 and 16 illustrate the fundamental application of my method to a modified form of bag. These figures show a tube 50 having a diamond fold 52 at one end and a similar fold 54 at the other end. The extremities of the diamond fold 52 comprise flaps 60 and 62. The extremities of the diamond fold 54 comprise flaps 56 and 58. Each diamond fold is precisely similar to the form illustrated in Fig. 3. The folds, as shown in Fig. 15, may both lie on the same side of the tube 50, or, alternatively, may lie on opposite sides. In either case, the double-end structure passes through steps illustrated in Figs. 5 through 14 inclusive, with the exception that one of the diamond folds, for example 54, is only partially closed. One of the flaps, for example 56, is neither folded nor transversely heat sealed. The end product is represented in Fig. 16 and the particular advantages of this construction are more fully set forth in my co-pending application Ser. No. 417,566, filed Nov. 1, 1941.

Figs. 17 and 18 illustrate an alternative to the step described in connection with Fig. 5. This alternative is particularly useful where the bottoming steps of Figs. 6 to 14 inclusive are to be carried out in a single machine integrally connected with the tuber. In Figs. 17 and 18 a bag blank 70 has been severed from a continuously formed tube and has been properly slit and scored for the formation of an automatic type bottom. The slitting and scoring provides end flaps 72 and 74. The bag 70 is advanced in the direction of the arrow E, and the flap 72 is raised above the flap 74 to open the diamond fold. A fixed guide member 80 is interposed in the path of the bag 70 parallel with the center line thereof. The opening of the diamond fold is timed relative to the advance of the bag toward the fixed member 80 so that the member 80 comes between the side flaps 76 and 78 before these flaps are drawn, by the opening of the diamond fold, into the plane of the front wall 70 of the bag. The flaps 76 and 78 are proportioned so as, normally, to extend across the center line of the tube 70 and would otherwise overlap. Overlap is, however, prevented by the presence of the guide 80. Continued movement of the bag 70 in the direction of the arrow E brings the flaps 76 and 78 into contact with a pair of guides 82 lying on opposite sides of the guide 80. These guides 82 press the flaps 76 and 78 into the plane of the face 70' of the bag 70 and leave, upstanding against the guide 80, those portions of the flaps 76 and 78 which would otherwise have overlapped in the manner of the flaps 22 and 24 as illustrated in Fig. 4. The condition, as shown in Fig. 18, is precisely similar to the condition illustrated in Figs. 6 and 7. The remaining steps are then carried out precisely as shown in Figs. 8 to 14 inclusive.

In the annexed claims the sequence in which the steps are recited is not a limitation unless the wording of the claim makes such limitation explicit.

What is claimed is:

1. A method of making bags which comprises: providing a flattened tube of flexible material having at least its interior surface thermoplastic; forming pairs of slits in each of the opposed walls at one end of said tube to define flaps; separating said flaps to open a diamond fold; bringing the inner surfaces of opposed margins of the material intermediate said flaps into face to face contact; heat sealing said contacting surfaces to form a fin, and folding said fin into the plane of the diamond fold; tilting the diamond fold away from the plane of the tube and effecting transverse heat seals across the ends of the diamond fold while thus tilted; and thereafter folding and securing said flaps in mutually superimposed relationship.

2. A method of making bags which comprises: providing a length of flattened tube formed of flexible material having at least its interior surface thermoplastic and having, at at least one end, flaps defined by pairs of slits in opposed walls of said flattened tube; advancing said tube in a direction parallel to its length while separating said flaps to open a diamond fold; during such advance, bringing the inner surfaces of opposed margins of the material intermediate said flaps into face to face contact and heat sealing said contacting surfaces to form a fin; during further advance of said tube in said direction, folding said fin into the plane of said diamond fold; thereafter advancing said tube in a direction at right angles to its length; during the latter advance tilting said diamond fold away from the plane of said tube, and effecting transverse heat seals across the ends of the diamond fold while thus tilted; and thereafter folding and securing said flaps in mutually superimposed relation.

3. In a method of making bags the steps which comprise: providing a length of flattened tube formed of flexible material having its interior, at least, thermoplastic, said tube having at at least one end flaps defined by pairs of slits in opposite walls, said flaps being separated into a diamond fold so proportioned as to bring the opposed margins of material intermediate said flaps into superimposed relation; advancing said diamond fold in a direction parallel to its major center line; engaging said superimposed margins with a fixed member to bring the inner surfaces of said margins into face to face contact; and thereafter effecting a heat seal along a portion, at least, of the area of said face to face contact.

4. In a method of making bags, the steps of providing a length of flattened tube formed of flexible material having its interior, at least, thermoplastic, said tube having, at at least one end, flaps defined by pairs of slits in opposite walls, said flaps being separated to form a diamond fold; tilting said diamond fold away from the plane of the tube; and effecting transverse heat seals across each end of the diamond fold while thus tilted.

5. In a method of making bags, the steps of providing a length of flattened tube formed of flexible material having its interior, at least, thermoplastic, said tube having, at at least one end, flaps defined by pairs of slits in opposite walls, said flaps being separated to form a diamond fold; advancing said tube in a direction at an angle to its length; during said advance tilting said diamond fold away from the plane of the tube; and effecting transverse heat seals across each end of the diamond fold while thus tilted.

6. In a method of making bags, the steps of providing a length of flattened tube formed of flexible material having its interior, at least, thermoplastic, said tube having, at at least one end flaps defined by pairs of slits in opposite walls, said flaps being separated to form a diamond fold; advancing said tube in a direction at right angles to its length; during said advance tilting said diamond fold away from the plane of the tube; and effecting transverse heat seals across each end of the diamond fold while thus tilted.

7. In a method of making bags, the steps of providing a length of flattened tube formed of flexible material having its interior, at least, thermoplastic, said tube having, at at least one end flaps defined by pairs of slits in opposite walls, said flaps being separated to form a diamond fold; advancing said tube in a direction at right angles to its length and in the plane of the tube; during said advance tilting said diamond fold away from the plane of the tube; and effecting transverse heat seals across each end of the diamond fold while thus tilted.

8. In a method of making bags the steps of providing a length of flattened tube of flexible material having at least its interior thermoplastic; providing pairs of slits in opposed walls of at least one end of said tube to define flaps; separating said flaps to open a diamond fold and to move opposed margins of the material intermediate said flaps toward each other; interposing a guide along the center line of said diamond fold; and bringing said opposed margins into parallel relationship against opposite sides of said guide.

9. In a method of making bags the steps of providing a length of flattened tube of flexible material having at least its interior thermoplastic; providing pairs of slits in opposed walls of at least one end of said tube to define flaps; separating said flaps to open a diamond fold and to move opposed margins of the material intermediate said flaps toward each other; interposing a guide along the centerline of said diamond fold; and bringing said opposed margins into parallel relationship against opposite sides of said guide, removing said guide and effecting a heat seal between said opposed margins.

10. In a method of making bags the steps of providing a length of flattened tube of flexible material having at least its interior thermoplastic; providing pairs of slits in opposed walls of at least one of said tube to define flaps; advancing said tube in the direction of its length and separating said flaps to open a diamond fold and to move opposed margins of the material intermediate said flaps toward each other; interposing a fixed guide in the path of the centerline of said diamond fold; and bringing said opposed margins into parallel relationship against opposite sides of said guide.

11. In a method of making bags the steps of providing a length of flattened tube of flexible material having at least its interior thermoplastic; providing pairs of slits in opposed walls of at least one end of said tube to define flaps; advancing said tube in the direction of its length and separating said flaps to open a diamond fold and to move opposed margins of the material intermediate said flaps toward each other; interposing a fixed guide in the path of the centerline of said diamond fold; and bringing said opposed margins into parallel relationship against opposite sides of said guide, removing said guide and effecting a heat seal between said opposed margins.

12. A method of making bags which comprises: providing a flattened tube of flexible material having at least its interior surface thermoplastic; forming pairs of slits in each of the opposed walls at one end of said tube to define flaps; separating said flaps to open a diamond fold; bringing the inner surfaces of opposed margins of the material intermediate said flaps into face to face contact; heat sealing said contacting surfaces to form a fin, and folding said fin into the plane of the diamond fold; tilting the diamond fold away from the plane of the tube and effecting transverse heat seals across the ends of the diamond fold while thus tilted; and thereafter folding and securing said flaps in mutually superimposed relationship, said heat sealing steps being carried out by means of a gaseous blast of predetermined temperature, direction, velocity and duration.

13. A method of making bags which comprises: providing a length of flattened tube formed of flexible material having at least its interior surface thermoplastic and having, at at least one end, flaps defined by pairs of slits in opposed walls of said flattened tube; advancing said tube in a direction parallel to its length while separating said flaps to open a diamond fold; during such advance, bringing the inner surfaces of opposed margins of the material intermediate said flaps into face to face contact and heat sealing said contacting surfaces to form a fin; during further advance of said tube in said direction, folding said fin into the plane of said diamond fold; thereafter advancing said tube in a direction at right angles to its length; during the latter advance tilting said diamond fold away from the plane of said tube, and effecting transverse heat seals across the ends of the diamond fold while thus tilted; thereafter folding and securing said flaps in mutually superimposed relation; said heat sealing steps being carried out by means of a gaseous blast of predetermined temperature, direction, velocity and duration.

14. In a method of making bags the steps which comprise: providing a length of flattened tube formed of flexible material having its interior, at least, thermoplastic, said tube having, at at least one end, flaps defined by pairs of slits in opposite walls, said flaps being separated into a diamond fold so proportioned as to bring the opposed margins of material intermediate said flaps into superimposed relation; advancing said diamond fold in a direction parallel to its major center line; engaging said superimposed flaps with a fixed member to bring the inner surfaces of the margins of said opposed flaps into face to face contact; and thereafter effecting a heat seal along a portion, at least, of the area of said face to face contact, said heat sealing steps being carried out by means of a gaseous blast of predetermined temperature, direction, velocity and duration.

15. In a method of making bags, the steps of providing a length of flattened tube formed of flexible material having its interior, at least, thermoplastic, said tube having, at at least one end flaps defined by pairs of slits in opposite walls, said flaps being separated to form a diamond fold; tilting said diamond fold away from the plane of the tube; and effecting transverse heat seals across each end of the diamond fold while thus tilted; said heat sealing steps being carried out by means of a gaseous blast of predetermined temperature, direction, velocity and duration.

16. In a method of making bag the steps of providing a length of flattened tube of flexible material having at least its interior thermoplastic; providing pairs of slits in opposed walls of at least one end of said tube to define flaps; separating said flaps to open a diamond fold and to move opposed margins of the material intermediate said flaps toward each other; interposing a guide along the centerline of said diamond fold; and bringing said opposed margins into parallel relationship against opposite sides of said guide, removing said guide and effecting a heat seal between said opposed margins; said heat sealing steps being carried out by means of a gaseous blast of predetermined temperature, direction, velocity and duration.

17. A method of making bags which comprises: providing a length of flattened tube formed of flexible material having at least its interior surface thermoplastic and having, at each end, flaps defined by pairs of slits in opposed walls of said flattened tube; advancing said tube in a direction parallel to its length while separating said flaps to open a diamond fold at each end; during such advance, bringing the inner surfaces of opposed margins of the material intermediate said flaps into face to face contact and heat sealing said contacting surfaces to form a fin; during further advance of said tube in said direction, folding said fin into the plane of said diamond fold; thereafter advancing said tube in a direction at right angles to its length; during the latter advance tilting both of said diamond folds away from the plane of said tube, and effecting transverse heat seals across the ends of the diamond folds while thus tilted; thereafter folding and securing the flaps of each diamond fold in mutually superimposed relation.

18. In a method of making bags the steps which comprise: providing a length of flattened tube formed of flexible material having its interior, at least, thermoplastic, said tube having at each end flaps defined by pairs of slits in opposite walls, the flaps at each end being separated into diamond folds so proportioned as to bring the opposed margins of material intermediate said flaps into superimposed relation; advancing said diamond folds in a direction parallel to their major center lines; engaging the superimposed margins of each diamond fold with a fixed member to bring the inner surfaces of said margins into face to face contact; and thereafter effecting a heat seal along a portion, at least, of the area of said face to face contact.

19. In a method of making bags, the steps of providing a length of flattened tube formed of flexible material having its interior, at least, thermoplastic, said tube having at each end flaps defined by pairs of slits in opposite walls, said flaps being separated to form a diamond fold at each end; tilting said diamond folds away from the plane of the tube; and effecting transverse heat seals across each end of each diamond fold while thus tilted.

20. In a method of making bags, the steps of providing a length of flattened tube formed of flexible material having its interior, at least, thermoplastic, said tube having at each end flaps defined by pairs of slits in opposite walls, said flaps being separated to form a diamond fold at each end; tilting said diamond folds away from the plane of the tube; and effecting transverse heat seals across each end of each diamond fold while thus tilted; folding said flaps into superimposed relationship in the plane of the diamond and securing them in such relationship.

21. In a method of making bags, the steps of providing a length of flattened tube formed of flexible material having its interior, at least, thermoplastic, said tube having at each end flaps defined by pairs of slits in opposite walls, said flaps being separated to form a diamond fold at each end; tilting said diamond folds away from the plane of the tube; and effecting transverse heat seals across each end of each diamond fold while thus tilted; trimming away a predetermined portion of at least one of said flaps at each fold; folding the flaps of each fold into superimposed relationship in the plane of their diamond fold and securing them in such relationship.

22. In a method of making bags, the steps of providing a length of flattened tube formed of flexible material having its interior, at least, thermoplastic, said tube having at each end flaps defined by pairs of slits in opposite walls, said flaps being separated to form a diamond fold at each end; tilting said diamond folds away from the plane of the tube; advancing said tube in a direction transverse its length with said diamond folds tilted as aforesaid; during such advance trimming from at least one of said flaps in each fold a predetermined portion; and during said advance folding the flaps of each fold into mutually superimposed relationship and securing them in such relationship.

23. In a method of making bags, the steps of providing a length of flattened tube formed of flexible material having its interior, at least, thermoplastic, said tube having, at at least one end, flaps defined by pairs of slits in opposite walls, said flaps being separated to form a diamond fold; tilting said diamond fold away from the plane of the tube; advancing said tube in a direction transverse its length with said diamond fold tilted as aforesaid; during such advance applying adhesive to a predetermined portion of both sides of one of said flaps and thereafter folding said flaps into superimposed relationship in the plane of said diamond with said adhesively treated flap undermost.

24. In a method of making bags, the steps of providing a length of flattened tube formed of flexible material having its interior, at least, thermoplastic, said tube having, at at least one end, flaps defined by pairs of slits in opposite walls, said flaps being separated to form a diamond fold; tilting said diamond fold away from the plane of the tube; and effecting transverse heat seals across each end of such diamond fold while thus tilted; trimming away a predetermined portion of at least one of said flaps; folding the flaps into superimposed relationship in the plane of said diamond fold and securing them in such relationship.

25. In a method of making bags, the steps of providing a length of flattened tube formed of flexible material having its interior, at least, thermoplastic, said tube having, at at least one end, flaps defined by pairs of slits in opposite walls, said flaps being separated to form a diamond fold; tilting said diamond fold away from the plane of the tube; advancing said tube in a direction transverse its length with said diamond fold tilted as aforesaid; during such advance trimming from at least one of said flaps a predetermined portion; and during said advance folding the flaps into mutually superimposed relationship and securing them in such relationship.

ALFRED B. HASLACHER.